Figure 1:
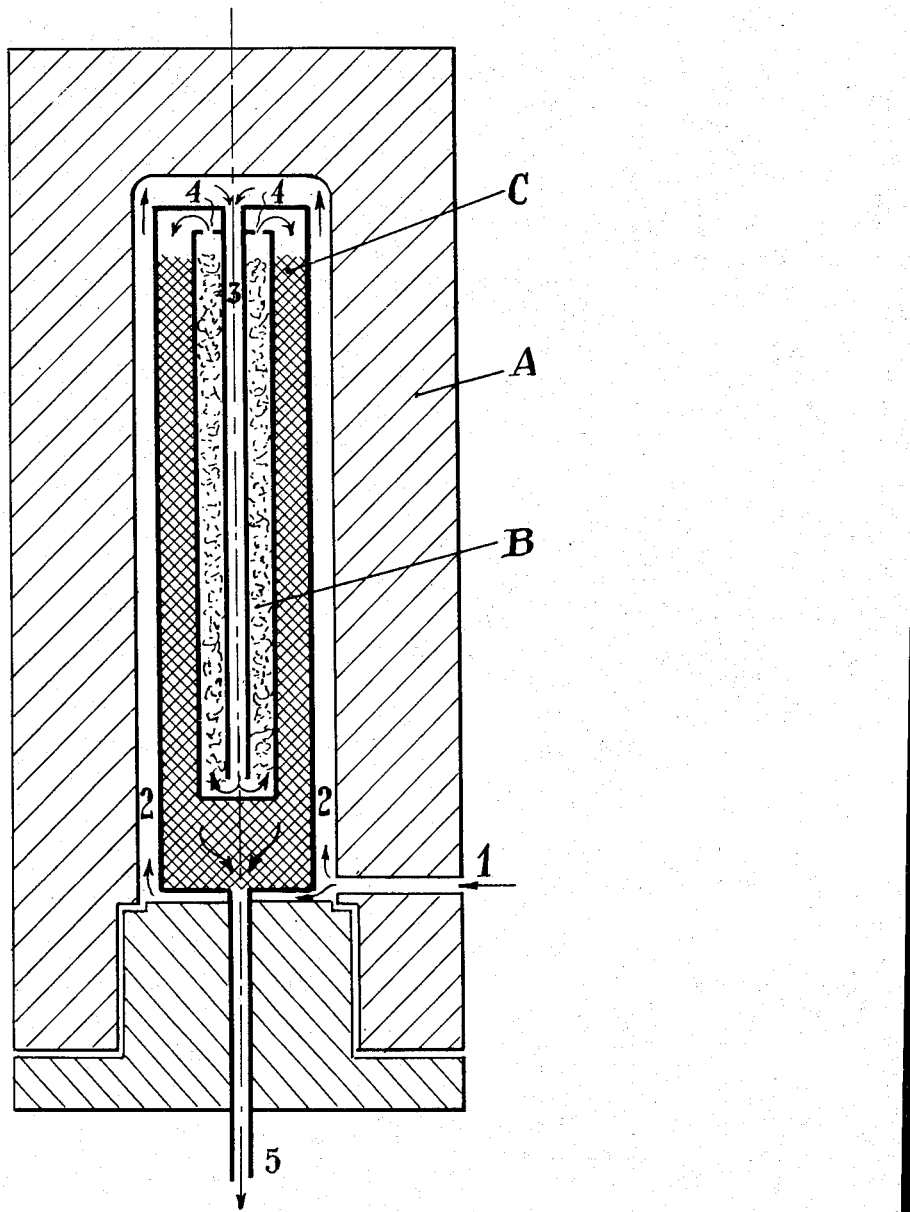

April 19, 1932.　　　　L. LHEURE　　　　1,855,134
PROCESS AND APPARATUS FOR EXOTHERMIC REACTIONS
Filed Feb. 27, 1929　　　2 Sheets-Sheet 1

INVENTOR
Louis Lheure
BY
ATTORNEYS

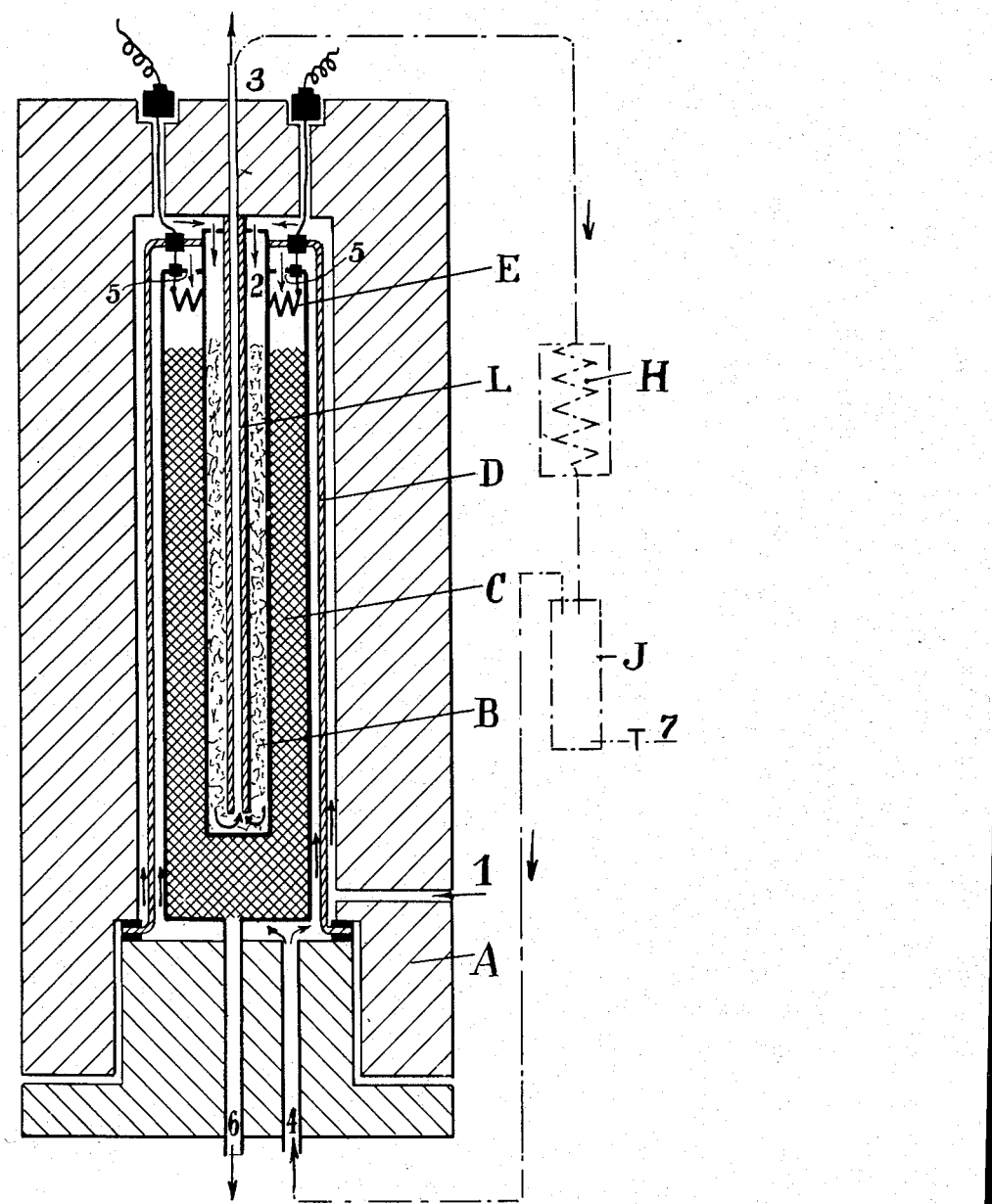

Patented Apr. 19, 1932

1,855,134

UNITED STATES PATENT OFFICE

LOUIS LHEURE, OF PARIS, FRANCE, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS AND APPARATUS FOR EXOTHERMIC REACTIONS

Application filed February 27, 1929, Serial No. 343,148, and in France March 2, 1928.

For the purification of gases intended for synthesis reactions, it is known to use reactions, (catalytic or not) which transform gaseous impurities into condensable or into neutral products. Said purification is generally obtained by causing the gaseous mixture to pass over catalyzing or non-catalyzing matter held in a special container, frequently known as a protube or a purifier tube fitted with the usual heating devices and with devices for exchanging heat between inflowing and outflowing gases whereby the material is maintained at a temperature sufficient for the purifying reaction to be practically complete.

But it is an obvious fact that, unless very elaborate heating and heat exchanging devices are used, the temperature cannot be maintained at a selected value if the purifying reaction evolves but little or no heat or if (which is equivalent) the reaction being exothermic the proportion of impurities is low.

According to this invention, it has been found that if, instead of effecting the purifying reaction in a special tube, it is caused to take place in a container surrounded with the catalyzing material which serves to operate the main reaction so that there may be indirect contact and, consequently, exchange of heat between the main reaction (which generally evolves a considerable amount of heat) and the purifying reaction there, is thus obtained, besides a considerable simplification of the plant, a far more uniform and reliable progress of the purifying reaction.

To carry out the invention, the fresh gas containing impurities are circulated first over the material used for purification and then (either immediately or after having eliminated through cooling or otherwise the products formed) over the catalyzer used for the main reaction.

The volume of gas treated by the two successive reactions may, of course, be different, either on account of there being added to the purified gas any amount of pure gas (consisting for instance, of gases that have not combined while passing a first time over the catalyzer) or owing to the taking off of a certain portion of the purified gas previous to its being passed over the main reaction catalyst.

A process taken as an example may be that of purifying a gaseous mixture of nitrogen and hydrogen intended for producing synthetic ammonia, which purification consists in hydrogenating oxygen into water and carbon monoxide into methane, or other organic compounds, and water. Referring to the two figures in the drawing appended hereto, several methods of performing the invention in the said particular case will now be described.

In Diagram 1: A is a container adapted to withstand high pressure; the nitrogen and hydrogen mixture containing a little oxygen and carbon monoxide enters through 1, rises in the space 2 while becoming heated, descends through 3 and reaches B, which contains the purifying reaction catalyst the gas flowing out of 4 contains no carbon monoxide and comes in contact in space C with the ammonia reaction catalyzer and reacts within said space C, thereby evolving heat which is used to maintain space B at such a temperature as will render the purifying reaction practically complete. The mixture of non-combined gases, ammonia and water flows out of 5.

If necessary, the outer wall A may be kept at a relatively low temperature by means of known devices.

Diagram 2 illustrates a method for causing the gases to come out of the tube after the purifying reaction is completed in order to eliminate (by condensation) water and the organic compounds formed if any. The fresh gas enters through 1, circulates round the casing D, reaches 2 wherein it traverses the purifying reaction catalyst B, flows out again through tube 3 (which is heat insulated at L) is cooled at H so that the water and the other condensed products are collected at J and drawn off through a valve 7. The gas then comes back through 4 to enter at 5 on the ammonia reaction catalyst C; the mixture of non-combined gases and of ammonia leaves through 6.

An electric heating device E supplies the balance of the heat required.

What I claim is:

1. A process for the purification at an elevated temperature of gases intended for an exothermic synthesis reaction which comprises the step of passing gases undergoing catalytic purification in heat exchange relation but out of direct contact with the gases undergoing the synthesis.

2. The process of effecting catalytic exothermic gaseous reactions under pressure which comprises warming the gases that are to react by passage thereof in heat exchange relation to but out of direct contact with the producer catalyst, passing said gases over a purifier catalyst, thereafter removing products of the purification reaction from the gases and thereafter delivering the purified gases to the producer catalyst.

3. The process of effecting catalytic exothermic gaseous reactions under pressure, which comprises warming the gases that are to react by passage thereof between the producer catalyst and the pressure-sustaining wall surrounding it, passing said gases over a purifier catalyst, thereafter removing products of the purification reaction from the gases and thereafter delivering the purified gases to the producer catalyst.

4. In a process of effecting a catalytic exothermic gaseous reaction under pressure the improvement which consists in preliminarily warming the gases that are to react by passage thereof in heat exchange relation to but out of direct contact with the producer catalyst, thereafter passing said gases over a purifier catalyst and thereafter removing products of the purification reaction from the gases.

5. The process of producing ammonia by catalytic synthesis under pressure from a gaseous mixture of its elements contaminated with carbon monoxide, which comprises warming said gaseous mixture by passage thereof between the ammonia catalyst and the pressure-sustaining wall surrounding it, passing said gases over a methane-forming catalyst, removing water from the gaseous mixture and thereafter contacting it with the ammonia catalyst.

6. In an apparatus for effecting catalytic exothermic gaseous reactions under pressure the combination of a catalytic reaction chamber comprising a purifier catalyst compartment and a producer catalyst compartment, said reaction chamber being surrounded by a pressure-sustaining wall spaced therefrom to form an annular gas passage; means to deliver compressed gases to said passage and means to convey the gases therefrom to the purifier catalyst compartment; a condenser outside the pressure-sustaining wall; means to convey the gases from the purifier catalyst compartment to said condenser and means to convey the gases therefrom to the producer catalyst compartment.

7. In an apparatus for effecting catalytic exothermic gaseous reactions under pressure the combination of a catalytic reaction chamber comprising a purifier catalyst compartment and a producer catalyst compartment in heat exchange relation thereto, said reaction chamber being surrounded by a pressure-sustaining wall spaced therefrom to form an annular gas passage; means to deliver compressed gases to said passage and means to convey the gases therefrom to the purifier catalyst compartment; a condenser outside the pressure-sustaining wall; means to convey the gases from the purifier catalyst compartment to said condenser and means to convey the gases therefrom to the producer catalyst compartment.

In testimony whereof I affix my signature.

LOUIS LHEURE.